United States Patent
Bowman et al.

(10) Patent No.: US 7,943,680 B2
(45) Date of Patent: May 17, 2011

(54) STRESS RELAXATION IN CROSSLINKED POLYMERS

(75) Inventors: Christopher N. Bowman, Boulder, CO (US); Timothy F. Scott, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 189 days.

(21) Appl. No.: 11/815,914

(22) PCT Filed: Feb. 10, 2006

(86) PCT No.: PCT/US2006/004756
§ 371 (c)(1),
(2), (4) Date: Apr. 10, 2008

(87) PCT Pub. No.: WO2006/086646
PCT Pub. Date: Aug. 17, 2006

(65) Prior Publication Data
US 2008/0269460 A1   Oct. 30, 2008

Related U.S. Application Data

(60) Provisional application No. 60/651,737, filed on Feb. 10, 2005, provisional application No. 60/763,564, filed on Jan. 31, 2006.

(51) Int. Cl.
*C08F 2/50* (2006.01)
*C08J 3/28* (2006.01)

(52) U.S. Cl. ......... 522/6; 522/7; 522/1; 522/31; 522/35; 522/49; 522/106; 522/107; 522/173; 522/150; 522/153; 522/162; 522/178; 522/189; 522/181; 522/904; 523/300

(58) Field of Classification Search .................. 522/7, 1, 522/31, 35, 49, 104, 107, 173, 150, 153, 522/162, 178, 189, 181, 904, 6; 523/300
See application file for complete search history.

(56) References Cited

U.S. PATENT DOCUMENTS

| | | | |
|---|---|---|---|
| 4,622,302 A | 11/1986 | Sowers | |
| 5,260,411 A | 11/1993 | Tesoro et al. | |
| 5,643,998 A | 7/1997 | Nakano et al. | |
| 5,654,368 A | 8/1997 | Nakano et al. | |
| 5,658,986 A | 8/1997 | Clouet | |
| 5,773,543 A | 6/1998 | Rizzardo et al. | |
| 5,866,047 A | 2/1999 | Nagino et al. | |
| 5,932,675 A | 8/1999 | Rizzardo et al. | |
| 5,977,278 A | 11/1999 | Rizzardo et al. | |
| 6,043,361 A | 3/2000 | Evans et al. | |
| 6,153,705 A | 11/2000 | Corpart et al. | |
| 6,596,899 B1 | 7/2003 | Lai | |
| 6,642,318 B1 | 11/2003 | Chiefari et al. | |
| 6,652,970 B1 | 11/2003 | Everarets et al. | |
| 6,667,376 B2 | 12/2003 | Charmot et al. | |
| 6,812,291 B1 | 11/2004 | Corpart et al. | |
| 6,919,409 B2 | 7/2005 | Charmot et al. | |
| 6,933,361 B2 | 8/2005 | Wudl et al. | |
| 2005/0014910 A1 | 1/2005 | Lepilleur | |

FOREIGN PATENT DOCUMENTS

| | | |
|---|---|---|
| CA | 2 394 029 | 6/2001 |
| EP | 0 592 283 | 4/1994 |
| WO | WO 88/04304 | 6/1988 |
| WO | WO 91/05779 | 5/1991 |
| WO | WO 93/22351 | 11/1993 |
| WO | WO 93/22355 | 11/1993 |
| WO | WO 94/14792 | 7/1994 |
| WO | WO 98/01478 | 1/1998 |
| WO | WO 98/58974 | 12/1998 |
| WO | WO 99/31144 | 6/1999 |
| WO | WO 99/35177 | 7/1999 |
| WO | WO 01/42379 | 6/2001 |
| WO | WO 03/102034 | 12/2003 |
| WO | WO 2004/087777 | 10/2004 |
| WO | WO 2006/004536 | 1/2006 |

OTHER PUBLICATIONS

Adhikari et al. (Sep. 2000) "Reclamation and Recycling of Waste Rubber," *Prog. Polym. Sci.* 25(7):909-948.
Athanassiou et al. (Apr. 18, 2005) "All-Optical Reversible Actuation of Photochromic-Polymer Microsystems," *Adv. Mater.* 17(8):988-992.
Chen et al. (Mar. 1, 2002) "A Thermally Re-Mendable Cross-Linked Polymeric Material," *Science* 295:1698-1702.
Eisenbach, C.D. (Oct. 1980) "Isomerization of Aromatic Azo Chromophores in Poly(ethyl acrylate) Networks and Photomechanical Effect," *Polymer* 21(10):1175-1179.
Evans et al. (2001) "Free Radical Ring-Opening Polymerization of Cyclic Allylic Sulfides: Liquid Monomers with Low Polymerization Volume Shrinkage," *J. Polym. Sci. A* 39(1):202-215.
Evans et al. (2000) "Free-Radical Ring-Opening Polymerization of Cyclic Allylic Sulfides. 2. Effect of Substituents on Seven- and Eight-Membered Ring Low Shrink Monomers," *Macromolecules* 33(18):6722-6731.
Finkelmann et al. (Jul. 2, 2001) "A New Opto-Mechanical Effect in Solids," *Phys. Rev. Lett.* 87(1):15501-15504.
Ikeda et al. (Feb. 5, 2003) "Anisotropic Bending and Unbeding Behavior of Azobenzene Liquid-Crystalline Gels by Light Exposure," *Adv. Mater.* 15(3):201-205.
Lendlein et al. (Apr. 14, 2005) "Light-Induced Shape-Memory Polymers," *Nature* 434:879-882.
Li et al. (Apr. 17, 2003) "Light-Driven Side-On Nematic Elastomer Actuators," *Adv. Mater.* 15(7-8):569-572.

(Continued)

*Primary Examiner* — Sanza L McClendon
(74) *Attorney, Agent, or Firm* — Greenlee Sullivan P.C.

(57) ABSTRACT

The invention provides methods for inducing reversible chain cleavage of polymer chains in a crosslinked polymeric material. Reversible cleavage of the polymer backbone is capable of relieving stress in the polymeric material as the bonds reform in a less stressed state. The invention also provides methods for making polymeric materials capable of reversible chain cleavage, materials made by the methods of the invention, and linear monomers containing reversible chain cleavage groups which are useful in the materials and methods of the invention.

21 Claims, 5 Drawing Sheets

OTHER PUBLICATIONS

Meijs et al. (1988) "Preparation of Controlled-Molecular-Weight, olefin-Terminated Polymers by Free Radical Methods. Chan Transfer Using Allylic Sulfides," *Macromolecules* 21(10):3122-3124.

Meijs et al. (1991) "Use of Substituted Allylic Sulfides to Prepare End-Functional Polymers of Controlled Molecular Weight by Free-Radical Polymerization" *Macromolecules* 24:3689-3695.

Scott et al. (Jun. 10, 2005) "Photoinduced Plasticity in Cross-linked Polymers," *Science* 308:1615-1617.

Scott et al. (Jul. 2006) "Actuation in Crosslinked Polymers via Photoinduced Stress Relaxation," *Adv. Mater.* 18(16):2128-2132.

Search Report, Corresponding to International Application No. PCT/US06/04756, Mailed Feb. 6, 2008.

Written Opinion, Corresponding to International Application No. PCT/US06/04756, Completed Jan. 2, 2008.

Harrisson et al. (2002) "Substituent Effects on the Chain-Transfer Behavior of 7-Methylene-2-methyl-1,5-dithiacyclooctane ni the Presence of Disulfides and Thiols," *J. Poly Sci. A Poly Chem.* 40:4421-4425.

Kloxin et al. (2009) "Stress Relaxation via Addition-Fragmentation Chain Transfer in a Thiol-ene Photopolymerization," *Macromolecules* 42:2551-2556.

Moad et al. (2006) *The Chemistry of Radical Polymerization*, 2nd ed., Elsevier Press, pp. 288-293, 296-300, 461-463, 498-499, 502-505.

Supplementary European Search Report, Corresponding to European Application No. EP 06 73 4750, Completed Oct. 15, 2009.

MDTA

MDTMA

MDTVE

STRESS RELAXATION IN CROSSLINKED POLYMERS

REFERENCE TO RELATED APPLICATIONS

This application claims the benefit of U.S. Provisional Application No. 60/651,737, filed Feb. 10, 2005 and U.S. Provisional Application No. 60/763,564, filed Jan. 31, 2006, both of which are incorporated by reference in their entirety to the extent not inconsistent with the disclosure herein.

ACKNOWLEDGEMENT OF GOVERNMENT SUPPORT

This invention was funded, at least in part, by the National Institutes of Health under grant numbers DE10959 and DE12998. The U.S. government has certain rights in this invention.

BACKGROUND OF THE INVENTION

This invention is in the field of crosslinked polymers, in particular methods for stress-relief in crosslinked polymers and materials resulting from the methods.

Cross-linked, gelled polymers have an "infinite" molecular weight and are described as thermosets, implying a network that cannot be melted or molded (Billlmeyer, F. W., 1984, Textbook of Polymer Science, 3$^{rd}$ ed., Wiley, New York, p 436). This description is true for most chemically cross-linked polymers; however several cross-linked networks are known to undergo bond cleavage or depolymerization at high temperatures or under various chemical or other treatments (Adhikari, B. et al., Prog. Polym. Sci., 2000, 25, 909). Although such treatments are useful for recycling purposes, there is an associated degradation in the mechanical properties of the polymers.

"Crack-healing" networks, such as those that use groups in the polymer backbone able to undergo thermoreversible Diels-Alder reactions, are able to relieve stress without mechanical degradation (Chen, X. et al., 2002, Science, 295, 1698). These reactions must be performed at elevated temperatures, making them unsuitable for thermally sensitive applications.

Reversible bond cleavage is also known to occur during some polymerization processes. Some controlled free radical polymerization techniques employ degenerative chain transfer agents such as reversible addition-fragmentation chain transfer (RAFT) agents and iniferters. As part of the RAFT process, the RAFT agent adds to an active chain. At that point, the RAFT agent may fragment, with part of the RAFT agent remaining attached to the end of the chain (now dormant) and the other part forming a new radical. Similarly, in processes employing iniferters, iniferter fragments attached to chains are attached at the chain ends.

BRIEF SUMMARY OF THE INVENTION

The invention provides methods for inducing reversible cleavage of polymer chains in a polymeric material. Reversible cleavage of the polymer backbone is capable of relieving stress as the bonds reform in a less stressed state. The methods of the invention can be applied to a variety of polymeric materials, including, but not limited to, polymeric coatings, dental materials, fiber reinforced materials, and optical materials.

The invention provides methods for relief of stress in crosslinked polymers. The stress relief may be of varying degrees, and need not be complete relief of all stress in the material. The stress may be internal, external, or a combination thereof. Internal stress buildup during polymerization of a crosslinked network is a typical result of polymerization shrinkage. Internal stress buildup may decrease the ultimate mechanical properties of the cured polymer and/or limit its applications. For example, in polymeric coatings and dental materials, internal stress may warp or crack the material or the underlying substrate.

The methods of the invention also can provide photoinduced plasticity, actuation and equilibrium shape changes without any accompanying residual stress. Polymeric materials such as these that are able to respond "on demand" with control of stress, shape and plasticity are critical to the development of microdevices, biomaterials and polymeric coatings.

The methods of the invention can achieve stress relief, photoinduced plasticity, actuation or equilibrium shape changes without any substantial permanent degradation in the mechanical properties of the material. In addition, the methods of the invention can alter the topology of the network without permanently changing the network connectivity.

The invention also provides polymeric materials capable of reversible chain cleavage and linear multifunctional monomers useful in making these materials. The invention further provides methods of making polymeric materials capable of reversible chain cleavage. Polymeric materials made by the processes of the invention can have reduced levels of internal stress when compared to polymeric materials made by conventional polymerization processes.

Reversible cleavage of the polymer backbone is enabled by incorporation of "reversible chain cleavage" groups or functionalities into the polymer backbone. Under the appropriate conditions, the reversible chain cleavage groups are activated, leading to reversible cleavage of the polymer backbone. At least some of the reversible chain cleavage groups are incorporated mid-chain. Depending on the nature of the chain cleavage group, the chain cleavage group may be activated through reaction with either a free radical or a cation. If the reversible chain cleavage group is an iniferter, the iniferter may be activated by light or heat.

DETAILED DESCRIPTION OF THE INVENTION

Figure 1A:
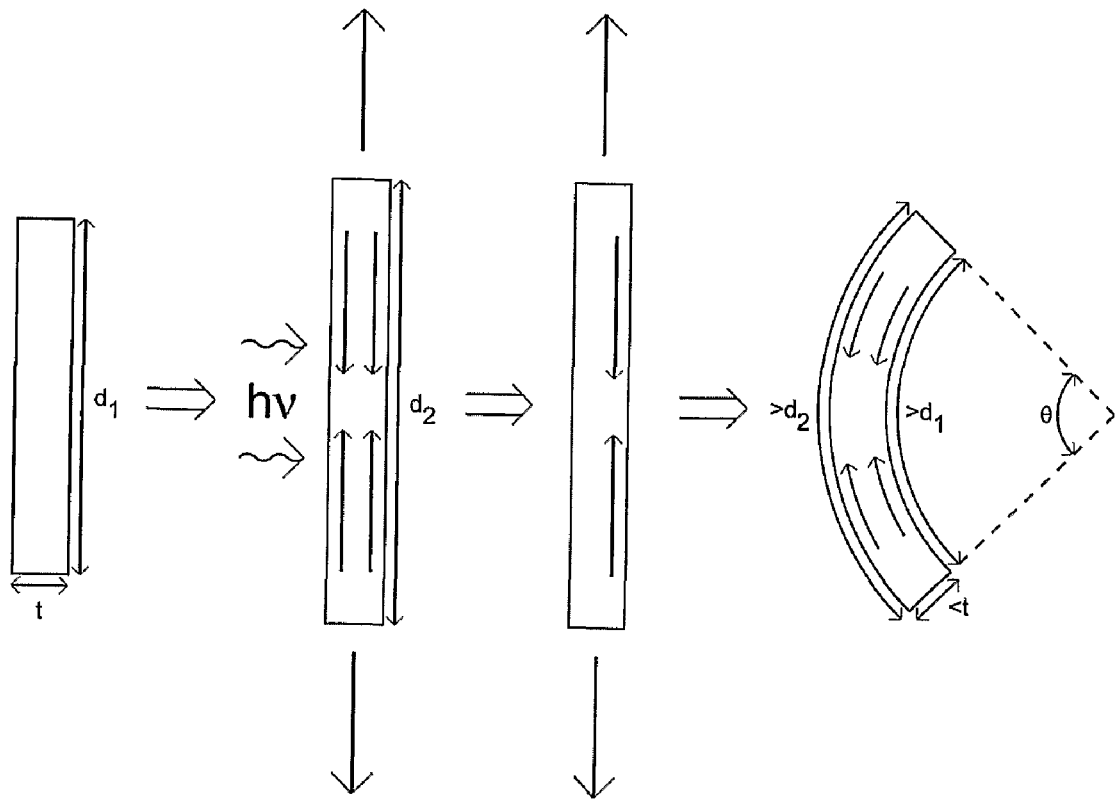
FIG. 1A: Schematic diagram of introduction of stress in a crosslinked, rubbery polymer. The original sample dimensions are shown at left. The sample is then strained in tension and irradiated on one side at a wavelength at which it is optically thick. The result is a stress gradient in the sample. At right, the sample bends as shown after the external tensile strain is removed.

The invention provides methods for inducing reversible chain cleavage in a polymeric material comprising a crosslinked network of polymer chains. As used herein, a polymeric material comprises a polymer and may further comprise non-polymeric additives. In the present invention, a multiplicity or plurality of the polymer chains incorporate at least one reversible chain cleavage group in the polymer backbone. Reversible chain cleavage groups incorporated in side chains or at the chain ends, rather than in the backbone, are not effective in producing stress relief.

As used herein, in a reversible chain cleavage process both chain cleavage and chain recombination occur. Recombination may occur through simple reversal of the chain cleavage reaction. In addition, the products of the chain cleavage reaction at one cleavage location are capable of participating in additional chain cleavage reactions, allowing combination of chain fragments from different cleavage locations and chain rearrangement. For example, the reversible chain cleavage process may be an addition-fragmentation process in which a radical reacts with an in-chain addition-fragmentation functionality to form an intermediate, which in turn fragments to reform the initial functionality and a new radical. The new radical may further react with another in-chain functionality or the initial functionality may further react with another radical generated by a different addition-fragmentation event. Chain rearrangement resulting from the reversible chain cleavage process can alter the topology of the network. In the absence of radical termination events or other side reactions, the number of reversible chain cleavage groups, and hence network strands, remains unchanged.

As used herein, a reversible chain cleavage group is capable of both breaking and forming in-chain bonds. In an embodiment, the reversible chain cleavage group is a chain transfer group which undergoes addition-fragmentation type chain transfer. As used herein, "addition-fragmentation" is either a two-step or concerted chain transfer mechanism wherein addition of a radical or cation is followed by fragmentation to generate a new radical or cation species. Scheme 1 illustrates a reaction mechanism for addition-fragmentation chain transfer within a polymer backbone incorporating an allyl sulfide functionality. In Scheme 1, an allyl sulfide group in the backbone reacts with a thiyl radical generated from a previous chain cleavage event, resulting in cleavage of the backbone and formation of a different thiyl radical (a R3 containing radical). The R3 containing thiol radical shown in scheme 1 is capable of reacting with an allyl sulfide group located at another chain position. The reformed allyl sulfide functionality is capable of reacting with another thiyl radical generated by chain cleavage.

Suitable addition-fragmentation functionalities or agents for use in the invention include conventional reversible addition-fragmentation chain transfer (RAFT) agents, allyl sulfides, dithiocarbamates, trithiocarbonates and thiuram disulfides. RAFT agents are known to those skilled in the art. Examples of RAFT agents are given in U.S. Pat. No. 6,153,705, and published international applications WO 98/01478, WO 99/35177, WO 99/31144 and WO 98/58974. Allylic sulfide chain transfer groups are described by Meijs et al. (1998, Macromolecules, 21(10), 3122-3124). Suitable addition-fragmentation chain transfer agents include trithiocarbonate or allyl sulfide functionalities.

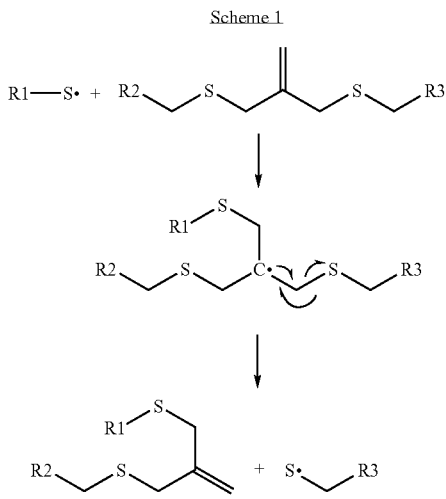

Scheme 1

Each reversible addition-fragmentation chain transfer agent is activated by reaction with a free radical or cation, the reaction being addition of the free radical or cation to the chain transfer agent. The reversible chain cleavage process is initiated by activating a source of free radicals or cations (other than the addition-fragmentation chain transfer agent), this source may also be termed a reversible chain cleavage initiator. At a later stage in the process, radicals or cations capable of activating the reversible addition-fragmentation chain transfer agents are also generated during the fragmentation steps. To obtain the desired amount of reversible chain cleavage, it may be desirable to continue to activate the source of free radicals or cations after the start of the reversible chain cleavage process. The recurring chain transfer reactions amplify the effects of each generated radical and lead to reaction diffusion of radicals through the cross-linked matrix.

When the reversible chain cleavage group is an addition-fragmentation group, a source of free radicals or cations is present during the polymerization process and is optionally incorporated into the polymeric material. A source of free radicals or cations is incorporated into the polymeric material if the reversible chain cleavage groups are to be activated after polymerization.

In an embodiment, the source of free radicals is a photoinitiator or a thermally activated initiator. In another embodiment, the source of free radicals is an iniferter, which may or may not be incorporated in the polymer chains. Use of an iniferter as the source of free radicals is expected to provide a virtually endless source of radicals, since iniferters are expected to be depleted significantly more slowly than more traditional radical sources. In another embodiment, the source of cations is a photoacid generator such as a diaryliodonium or triaryl sulfonium salts. As used herein, the source of free radicals or cations is activated when it produces free radicals or cations. In an embodiment, the source of radicals or cations is activated so as to produce a greater concentration of radicals or cations than would be produced by ambient conditions. For example, a photoinitiator or iniferter may be activated by a artificial light source such as a uv lamp rather than by simple exposure to sunlight. The source of free radicals or cations may consist of a combination of different sources of free radicals or cations. In an embodiment, the source of free radicals comprises two photoinitiators which are activated by different wavelengths of light. In this embodiment, one photoinitiator may be activated during the polymerization process and the other activated subsequent to polymerization. For example, one photoinitiator may be a photoinitiator active in the visible region of the spectrum and the other may be active in the near ultraviolet.

The source of free radicals or cations may be activated by any method known to the art, including exposure to light, heat, or an electron beam. The time for which the free radical/cation source is activated and the concentration of the free radical/cation source can influence the amount of backbone cleavage which occurs. The source of free radicals or cations can be activated during polymerization, following polymerization, or both The reversible chain cleavage initiators are present in an amount effective to produce the desired amount of reversible chain cleavage. In one embodiment where the polymeric material is made by polymerization of a mixture comprising at least one monomer containing an in-chain reversible chain cleavage group, the amount of reversible chain initiator provided in the mixture is greater than the amount that would typically be used for polymerization of a similar mixture comprising a similar monomer not containing an in-chain reversible chain cleavage group. As described above a combination of initiators may also be used to ensure that sufficient initiator remains after polymerization is complete. The effective amount of reversible chain initiator will depend on the efficiency of the system, the time for during which reverse chain cleavage occurs, and the amount of impurities in the system. In an embodiment, the concentration of the source of free radicals or cations is between 0.1 wt % and 5.0 wt %

In another embodiment, the reversible chain cleavage group is a reactive group which undergoes reversible fragmentation and recombination. Chain cleavage occurs during the fragmentation step. In this embodiment, the reversible chain cleavage group is activated by exposure to conditions which initiate fragmentation of the reversible chain cleavage group. No separate source of free radicals or cations (other than the reversible chain cleavage group) is required. Suitable reactive groups useful for this embodiment include iniferters. Iniferter compounds are known to those skilled in the art and include, but are not limited to, dithiocarbamates and thiuram disulfides. Iniferters contain a chemical bond that will homolytically cleave under appropriate thermal or photolytic conditions, forming either one sulfur centered and one carbon centered radical or two sulfur centered radicals. Rearrangement of the network connectivity occurs when radicals generated by two different chain cleavage events recombine. In this embodiment, during the cleavage event the crosslink density can temporarily decrease, but returns to normal after recombination.

In another embodiment, the polymeric material incorporates a plurality of chemically different reversible chain cleavage groups. For example, the polymeric material may incorporate two chemically different reversible addition-fragmentation chain transfer groups or may incorporate at least one reversible addition-fragmentation chain transfer group and at least one fragmentation and recombination group. For example, including an addition-fragmentation functionality in combination with an iniferter as a source of free radicals has the potential to allow the production of unlimited plasticity in the material which wouldn't be possible with a conventional initiator. A conventional initiator would expected to run out after a certain light dose (for a photoinitiator) or time (for a thermal initiator).

In an embodiment, the reversible chain cleavage group can be incorporated into the polymer backbone by polymerization of a monomer comprising the chain cleavage group. The monomer comprising the chain cleavage group may be a ring opening monomer or a linear monomer. Ring opening monomers suitable for the practice of the invention include, but are not limited to, cyclic allylic sulfides. Cyclic allylic sulfide monomers capable of free-radical ring-opening polymerization are reported by Evans and Rizzardo (Evans, R. et al., 2001, J. Polym. Sci. A, 39, 202) and in U.S. Pat. No. 6,043,361 to Evans et al.

Linear monomers suitable for the practice of the invention include multifunctional monomers containing an addition-fragmentation chain transfer functionality in their backbone, as shown in Formula 1.

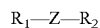   Formula 1

In Formula 1, $R_1$ and $R_2$ each independently comprise at least one polymerizable group. Examples of polymerizable groups include, but are not limited to, acrylates, methacrylates, oxiranes (epoxies), amines, vinyl ethers, vinylics, allyl ethers, allylics, thiols, styrenics, isocyanates, and hydroxides, and combinations thereof. In an embodiment, the polymerizable group is selected from the group consisting of acrylates, methacrylates, vinyl ethers, and allyl ethers. Z is a reversible chain cleavage group. $R_1$, $R_2$ and Z may be attached together with any suitable linker group such as a $C_1$-$C_{10}$ alkyl chain that may be optionally substituted with cyclic or aromatic functionalities. In an embodiment, the multifunctional monomer is a difunctional monomer. These linear monomers may be made by synthetic methods known to those skilled in the art.

In an embodiment, the linear multifunctional monomer is as shown in Formula 2:

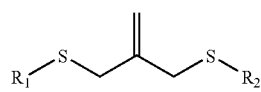   Formula 2

In an embodiment, R1 and R2 comprise polymerizable groups which are both acrylate, methacrylate, or vinyl ether groups. In Formula 2, Z is an allyl disulfide functionality.

Use of linear monomers rather than cyclic ring-opening monomers in the practice of the invention can have several advantages. The use of linear monomers allows much greater flexibility as to potential monomer structure and can allow for increased glass transition temperatures. The monomer synthesis process can also be simplified. The polymerization reaction can also be much faster and higher crosslink densities can be achieved, allowing attainment of higher glass transition temperatures. Materials with higher transition temperatures are more useful for structural purposes which require a hard glassy material rather than a soft rubbery material.

In another embodiment, the reversible chain cleavage group can be incorporated into the polymer backbone by copolymerization of a first monomer comprising the reversible chain cleavage group with at least one other monomer. The other monomer(s) to be copolymerized with the first monomer can be any monomer known to the art, so long as it can be successfully copolymerized with the first monomer. The amount of the first monomer is selected to provide the desired amount of reversible chain cleavage group incorporation into the polymer backbone. The selection of the amount of the first monomer depends in part on the desired amount of stress relief and the desired mechanical or chemical properties of the copolymer.

Monomers suitable for the practice of the invention include those which are capable of forming cross-linked networks of polymer chains, either singly or in combination with one or more other monomers. Suitable monomers for the practice of the invention include, but are not limited to: ethylene oxides (for example, PEO), ethylene glycols (for example, PEG), vinyl acetates (for example, PVA), vinyl pyrrolidones (for example, PVP), ethyloxazolines (for example, PEOX), amino acids, saccharides, proteins, anhydrides, vinyl ethers, thiols, amides, carbonates, phenylene oxides (for example, PPO), acetals, sulfones, phenylene sulfides (for example, PPS), esters, fluoropolymers, imides, amide-imides, etherimides, ionomers, aryletherketones, olefins, styrenes, vinyl chlorides, ethylenes, acrylates, methacrylates, amines, phenols, acids, nitrites, acrylamides, maleates, benzenes, epoxies, cinnamates, azoles, silanes, chlorides, epoxides, lactones, isocyanates, hydroxides and amides.

One measure of the relative number of reversible chain cleavage groups in the crosslinked polymer network is the ratio of the number of reversible chain transfer groups to the number of crosslinks in the network. This ratio is selected based partly on the desired extent of reversible chain cleavage in the network and partly on the desired mechanical properties of the material (e.g. the elastic modulus). In different embodiments, the ratio of the number of reversible chain transfer groups to the number of crosslinks in the network is greater than or equal to one-quarter, greater than or equal to one-half, greater than or equal to one, greater than or equal to one and one-half, or greater than or equal to two.

The invention also provides methods for making polymeric materials. In an embodiment, the method comprises the steps of forming a mixture comprising one or more monomers, wherein at least one monomer is characterized by Formula 1 or 2 and subjecting the mixture to polymerization conditions. If the reversible chain cleavage group is an addition-fragmentation group, the mixture further comprises a source of free radicals or cations. As used herein, polymerization conditions are those conditions that cause the at least one monomer to form a polymer, such as temperature, pressure, atmosphere, ratio of starting components used in the polymerization mixture, reaction time, or external stimuli of the polymerization mixture. The polymerization process can be carried out in bulk, or solution, or other conventional polymerization modes. The process is operated at any of the reaction conditions appropriate to the polymerization mechanism.

The polymerization mechanism may be any mechanism known to the art, including step-reaction and chain-reaction. When the reversible chain cleavage agent is an addition-fragmentation chain transfer agent, the polymerization process is conducted in the presence of a free radical/cation source to ensure that the free radical/cation source is incorporated in the polymeric material. However, depending on the nature of the polymerization process, the free radical/cation source may or may not be activated during polymerization. In an embodiment, the method for making the polymeric material forms a mixture of a monomer described by Formula 1, wherein Z is an addition-fragmentation agent activated by free radicals, and a source of free radicals, but the source of free radicals is not activated as part of the polymerization conditions. The combination of the monomer(s) and the free radical/cation source may be selected to produce reversible chain cleavage during the polymerization process. For example, if the polymerization mechanism involves free-radical polymerization an addition-fragmentation chain transfer group such as an allyl sulfide is likely to lead to chain transfer during the polymerization process. If chain transfer occurs during polymerization, the reversible chain-cleavage group incorporated into the backbone may differ somewhat from the reversible chain-cleavage group present in the monomer (e.g. the R groups may change).

The combination of the monomer and the free radical/cation source may also be selected so that reversible chain cleavage does not occur during the polymerization process, in which case the free radical/cation source is present during polymerization to ensure its incorporation into the polymeric material. If the polymerization mechanism does not involve free radicals, an addition-fragmentation chain transfer functionality such as an allyl sulfide will not usually lead to chain transfer during the polymerization process. For example, divinyl ether functionalized monomers containing an addition-fragmentation chain transfer group can be cationically photopolymerized at wavelengths different than those which activate a photoinitiator free radical source. Similarly, epoxy amine systems in which at least one monomer incorporates a reversible chain cleavage group can be polymerized without activating the reversible chain cleavage group. However, chain transfer can be "forced" in this type of system by activating a source of radicals or cations that is not required for the curing process (e.g. by activating a photoinitiator during the curing process).

If reversible chain cleavage is to occur after polymerization, the polymerized material is exposed to conditions sufficient to cause activation of the reversible chain cleavage group. If the reversible chain cleavage group is an addition-fragmentation chain transfer group, polymerized material is also exposed to conditions sufficient to cause activation of the source of free radicals or cations. The free radicals or cations produced can react with the reversible chain-cleavage groups, thereby activating the reversible chain-cleavage groups. Reaction of a chain transfer group with the free radical or cation produced by the free radical/cation source can result in generation of a free radical different than that produced by the free radical/cation source; this newly generated free radical can react with other reversible chain transfer groups in turn.

The end result of the polymerization process is a polymeric material comprising a crosslinked network of polymer chains. In an embodiment, the present invention provides polymeric materials capable of reversible chain cleavage subsequent to polymerization. In the polymeric materials of the invention, a plurality or multiplicity of the polymer chains incorporate at least one reversible chain cleavage group in the polymer backbone. If the reversible chain cleavage group is an addition-fragmentation chain transfer group, the polymeric material further comprises an effective amount of a free radical/cation source. The novel crosslinked polymeric materials of the invention are not intended to include previously reported polymeric materials which contain in-chain allyl sulfide groups or thiuram disulfide groups, such as the materials reported by Evans and Rizzardo (Evans, R. et al., 2001, J. Polym. Sci. A, 39, 202) and in U.S. Pat. No. 6,043,361 to Evans et al. or the thiuram disulfide containing materials reported by Clouet in U.S. Pat. No. 5,658,986 and publication WO 91/05779. Some of these previously reported materials may include residual levels of thermal initiators or photoinitiators following polymerization.

The invention also provides methods of making crosslinked polymeric materials capable of reversible chain cleavage. In an embodiment, the methods involve polymerizing a monomer with a mid-chain addition-fragmentation group. However, the polymerization conditions may vary. For example, polymerization may take place in the presence of a source of free radicals or cations although the polymerization does not occur through free radical polymerization. In addition, the polymerization may involve the monomers of Formula 1 or 2.

The invention provides methods for relief or reduction of stress in crosslinked polymers. The stress relief may be of varying degrees, and need not be complete relief of all stress in the material. For example, the amount of stress reduction can range from less than one percent to nearly one hundred percent. The stress may be internal, external, or a combination thereof. In an embodiment, the methods of the invention can also be used to produce materials which have lower internal stress than would be produced with polymerization techniques previously known to the art.

The amount of stress relaxation depends upon the number of reversible chain cleavage groups in the material, the amount of time during which reversible chain cleavage occurs, and the conditions under which reversible chain cleavage occurs (e.g. when reversible chain cleavage is initiated by a photoinitiator, the intensity of the light source). For a given material under a given initial stress, the stress level in the material can decrease more rapidly at the start of the stress relaxation process and then level out at longer times. One measure of the amount of stress relief is the percent change in stress in a material having a constant initial stress level, either at a set time or after the stress level has started to level out. In this embodiment, the reduction in stress obtained after 5 minutes can be greater than or equal to 10%, greater than or equal to 20%, or greater than or equal to 30%. The reduction in stress obtained at longer times can be greater than or equal to 90%. Another indicator of the amount of stress relief is the amount of creep, or the amount of deformation which occurs under constant load, due to the stress relaxation process. A third indicator of the amount of stress relief is the percent change in the stress level in a material under constant strain. In this embodiment, the reduction in stress obtained after 5 minutes can be greater than or equal to 20%, greater than or equal to 30%, or greater than or equal to 40%. The reduction in stress obtained at longer times can be greater than or equal to 90%. The reduction in stress as a function of time can be obtained through mechanical testing techniques known to those skilled in the art. In some cases, such as for rubbery samples, the stress can "even out" over more than the irradiated portion of the sample. For materials which display viscoelastic behavior the strain rate should be selected appropriately.

Reversible chain cleavage within the polymeric material can reduce the level of internal stress in the material. Internal stress buildup during polymerization of a crosslinked network is a typical result of polymerization shrinkage. As used herein, internal stress is the stress that exists in a solid when no force is applied.

Figure 1B:
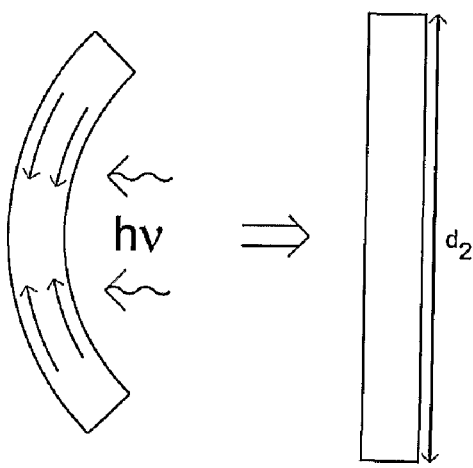
FIG. 1B: Schematic diagram showing actuation in a crosslinked rubbery polymer. At left, the sample from FIG. 1A is irradiated on the previously unirradiated side. The result, shown at right, allows elimination of the introduced stress and actuation of the sample.

Reversible chain cleavage within the polymeric material after polymerization can also allow actuation of the material in response to light. In this case, either the reversible chain cleavage group or the reversible chain cleavage initiator is light activated. In an embodiment, a stress is evenly placed throughout an optically thick sample followed by irradiation of only one side of the sample so that radicals are produced and the stress is relieved preferentially on the irradiated side. A stress gradient is therefore introduced through the sample thickness (see FIG. 1a) which, upon removal from the apparatus, results in the sample bending to distribute the stress evenly throughout the sample. Actuation in the stressed sample is possible by relieving the induced stress on a single side, as the sample deforms continuously to eliminate the subsequent stress gradient (FIG. 1b). As shown in FIG. 1b, if the introduced stress is completely eliminated the sample can return to its original flat shape (although the length of the sample, d2, is larger than that of the sample in its initial state). Therefore, the polymeric material of the invention, when irradiated appropriately, can display a shape memory effect.

Photoinduced actuation has several advantages over more common thermally-induced shape memory. The lack of a need for a temperature rise to instigate a phase change leading to actuation is important in numerous thermally sensitive applications. Additionally, photopatterning may be utilized in both the formation and release of the temporary shape, thus actuation patterns may be achieved which are unobtainable via thermal methods. For example, the sample can be masked, strained in tension and irradiated on both sides in an alternating pattern. The resultant shape may be released in any chosen arbitrary pattern, given appropriately designed and patterned light exposure.

Photoinduced actuation via this addition-relaxation chain transfer process is able to avoid several of the limitations posed by the previously described photoinduced actuation methods ((Eisenbach, C. D., 1980, Polymer 21(10), 1175-1179)(Finkelmann, H. et al., 2001, Phys. Rev. Lett 87(1), 15501-15504) (Li, M.-H. et al., 2003, Adv. Mater. 15(7-8), 569-572) (Ikeda, T. et al., 2003, Adv. Mater. 15(3), 201-205 (Athanassiou, A., et al. 2005, Adv. Mater. 17(8), 988-992) (Lendlein, A. et al., 2005, Nature 434, 879-882)). Every other system described in these references exhibits a photon to reaction event ratio no greater than one, where one photon either causes one photoisomerization reaction or one bond cleavage. Conversely, while one photon in the process described here leads to at most a single cleavage event of a photoinitiator molecule, the two radicals formed as a result of the photoinitiator cleavage can lead to many chain transfer events, i.e. network strand breakage and reformation. Additionally, a large range of photoinitiating systems with photoactivities ranging from the ultraviolet to the near infrared are available (Fouassier, J.-P., 1995, Photoinitiation, Photopolymerization, and Photocuring: fundamentals and applications, Hanser, Munich), thus inherent limitations imposed on the usable wavelengths for other systems are readily avoidable.

In one embodiment which allows rapid photoinduced actuation via stress relaxation, the network has the following characteristics: the network has a glass transition temperature ($T_g$) below room temperature (so adequate chain mobility exists at working temperatures), a sufficiently high crosslink density (and hence a sufficiently high rubbery modulus), a sufficiently high ability to be elastically strained in tension without breaking (a sufficiently high breaking strain), and should respond rapidly and extensively to relieve stress in only a portion of the network. The combination of high modulus, high breaking strain and the ability to relieve stress in only one part of the polymer material enables the generation of a large amount of internal stress in the material.

It should also be noted that the actuation produced by this system is not limited to photoactivation. Other stimuli able to produce radicals preferentially at one surface, such as chemical species able to induce redox reactions or temperature to induce decomposition of thermal initiators, are capable of producing actuation. While perhaps less controllable than irradiation exposure, these mechanisms increase the flexibility of the current system, allowing it to be applied to a host of applications.

In an embodiment, the methods for relief of stress involve making a polymeric material capable of reversible chain cleavage by the methods of the invention and then inducing reversible chain cleavage in the material.

In an embodiment, the invention provides a method for relieving stress in a crosslinked polymeric material, the method comprising the steps of:
a) providing a monomer comprising a reversible addition-fragmentation group;
b) polymerizing the monomer in the presence of a source of free radicals or cations, the polymerization occurring under conditions sufficient to form a polymeric material comprising the source of free radicals or cations and a crosslinked network of polymer chains, wherein a multiplicity of the polymer chains incorporate at least one reversible chain cleavage group in the polymer backbone; and
c) after polymerization of the monomer, providing conditions sufficient to activate the source of free radicals or cations and the reversible chain cleavage groups, thereby causing polymer backbone chain cleavage and relief of stress in the polymeric material.

In another embodiment, the invention provides a method for relieving stress in a crosslinked polymeric material, the method comprising the steps of:
a) providing at least two monomers, at least one of the monomers comprising a reversible addition-fragmentation group;
b) co-polymerizing the monomers in the presence of a source of free radicals or cations, the co-polymerization occurring under conditions sufficient to form a polymeric material comprising the source of free radicals or cations and a crosslinked network of polymer chains, wherein a multiplicity of the polymer chains incorporate at least one reversible chain cleavage group in the polymer backbone; and
c) after polymerization of the monomers, providing conditions sufficient to activate the source of free radicals or cations and the reversible chain cleavage groups, thereby causing polymer backbone chain cleavage and relief of stress in the polymeric material.

The invention also provides similar methods for relieving stress for reversible fragmentation and recombination chain cleavage groups, except that a separate source of free radicals or cations is not required.

The stress relief provided by the methods of the invention enables the material to be "molded" and subsequently destressed, allowing for arbitrary shapes to be obtained after cure.

The methods of the invention can be used to selectively relieve stress or to introduce stress gradients in a cross-linked material. Selective actuation of the source of free radicals or cations in a portion of the material can lead to relief of stress in that portion only. For example, irradiation of one side of an optically thick material under stress can cause relief of stress in the irradiated portion only, which releases stress preferentially on the exposed side. The ability to selectively relieve stress in different portions of the material also allows shape-change or actuation phenomena. For example, irradiation of one side of a thin specimen of optically thick material can cause curvature of specimen, with the specimen warping away from the direction of irradiation. Irradiation of the other side of the specimen releases the curvature. As used herein, in an optically thick material the light intensity is significantly attenuated as the light passes through the material. In an embodiment, the attenuation is at least 10%.

The invention therefore also provides methods for photoactuation of polymeric materials capable of reversible chain cleavage. In an embodiment, a photoactuation method includes the steps of introducing a internal stress gradient into an optically thick material capable of reversible chain cleavage and then releasing at least part of the internal stress by irradiating the material. The internal stress gradient may be introduced into the material part by placing it under external tensile stress, irradiating part of the material, and then releasing the external stress.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, starting materials, and synthetic methods, other than those specifically exemplified can be employed in the practice of the invention without resort to undue experimentation. All art-known functional equivalents, of any such methods, starting materials, and synthetic methods, are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. Any preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

Example 1

Formulation of Tetrathiol/Divinyl Ether/MDTO Materials

The base network was formed from a stoichiometric mixture of pentaerythritol tetra(3-mercaptopropionate) (PETMP) and triethyleneglycol divinylether (TEGDVE) which produces a rubbery network with a glass transition temperature of approximately −25° C. This monomer system was modified with the addition of varying concentrations of the ring opening monomer 2-methyl-7-methylene-1,5-dithiacyclooctane (MDTO) as a comonomer.

Resins were formulated with two photoinitiators, one active in the visible region of the spectrum (Irgacure 784 (a titanocene derivative from Ciba Specialty Chemicals)) at 0.1 wt % and one active in the near ultraviolet (Irgacure 819 (a phenylphosphine oxide derivative from Ciba)) at 0.25 wt %, unless otherwise stated. The visible photoinitiator photolyses rapidly and photobleaches significantly during the curing stage, thus the ultraviolet photoinitiator was included in the formulation to ensure residual photoinitiator capable of introducing radicals in each specimen upon irradiation. Each resin consisted of a stoichiometric ratio of PETMP and TEGDVE as well as varying concentrations of MDTO.

Example 2

Stress Relaxation of Tetrathiol/Divinyl Ether/MDTO Materials

Specimens for stress relaxation experiments had approximate dimensions of 60 mm long×7 mm wide×0.9 mm thick. These specimens were mounted in a MTS Synergie 100 mechanical tester fitted with a 10 N load cell and the initial gap between the grips was set to 40 mm. For the 'constant initial stress' experiments, a strain rate of 0.0064 min$^{-1}$ was applied until a stress of 0.15 MPa was achieved then the strain was maintained for the remainder of the experiment. The specimen was then irradiated (320-500 nm, 20 mW·cm$^{-2}$) for 15 minutes, starting 60 seconds after the stress of 0.15 MPa was achieved.

Figure 2A:
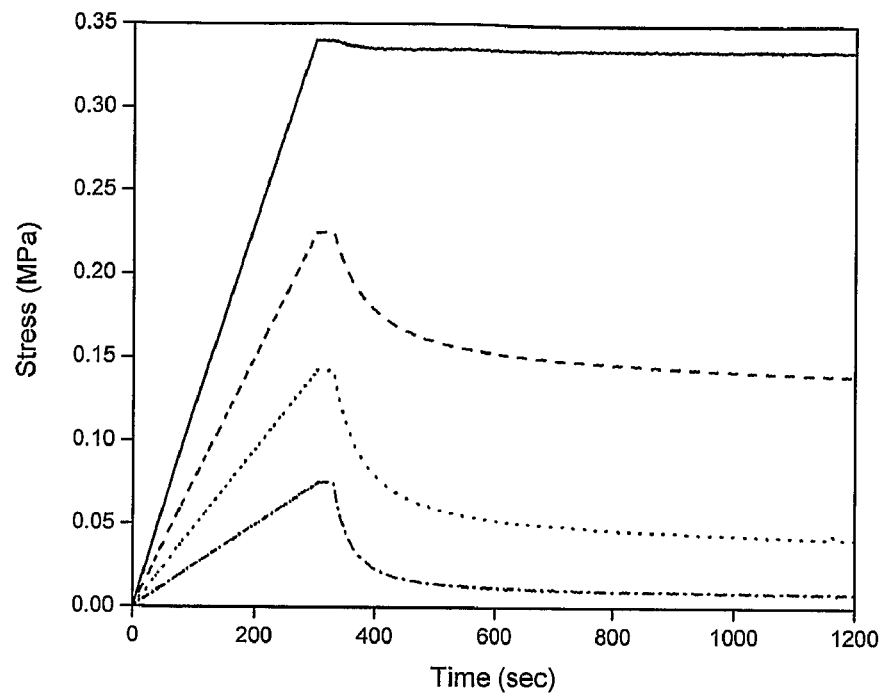
FIG. 2A: Stress versus time for tetrathiol/divinyl ether/ MDTO materials with four MDTO concentrations starting from constant initial strain (solid line, 0 wt %, dashed line 25 wt %, dotted line, 50 wt %, dashed-dotted line 75 wt %). The specimens were irradiated at 320-500 nm, 20 mW/cm$^2$.
Figure 2B:
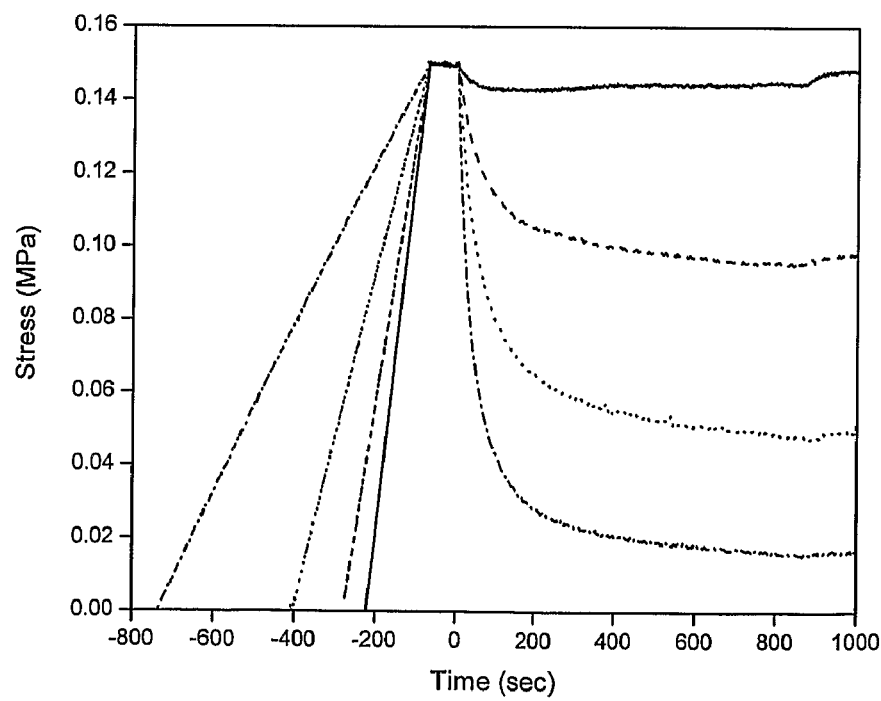
FIG. 2B: Stress versus time for tetrathiol/divinyl ether/ MDTO materials with four MDTO concentrations starting from constant initial stress (solid line, 0 wt %, dashed line 25 wt %, dotted line, 50 wt %, dashed-dotted line 75 wt %). The specimens were irradiated at 320-500 nm, 20 mW/cm$^2$.

FIGS. 2A and 2B show stress versus time for four MDTO concentrations (solid line, 0 wt %, dashed line, 25 wt %, dotted line, 50 wt %, dashed-dotted line, 75 wt %). FIG. 2A is for constant strain (irradiation started at t=330 sec); FIG. 2B is for constant initial stress (offset to align the start of irradiation at t=0, irradiation stopped at 900 sec). At a constant applied stress, both the rate and degree of stress relaxation increase with MDTO concentration. Without wishing to be bound by any particular theory, we attribute this response to an increased probability of addition-fragmentation chain transfer groups in the network strands. After cessation of irradiation, the stress actually rose slightly due to shrinkage of the specimen due to a cooling effect when the heating by the lamp is terminated.

Results presented in FIGS. 2A and 2B would appear similar if the mechanism of stress relaxation was not due to chain transfer but rather was the result of a decrease in the modulus due to photodegradation. It is possible to determine whether the network is simply undergoing photodegradation during irradiation, perhaps by the shorter wavelength ultraviolet, by measuring the modulus of the material both before and after irradiation. The elastic moduli (determined in tension) of the specimens both before and after the irradiation experiments shown in FIG. 2A are presented in Table 1. The slight increase in the modulus post-irradiation clearly indicates that photodegradation is not responsible for the dramatic stress relaxation.

The ratio of cross-links to allyl sulfide groups was as follows:

0 wt % MDTO 1:0, 25 wt % MDTO 1.17:1, 50 wt % MDTO 0.390:1, 75 wt % MDTO 0.130:1.

TABLE 1

| [MDTO] (wt %) | Modulus before extension and irradiation (MPa) | Modulus after extension and irradiation (MPa) |
|---|---|---|
| 0 | 11.5 | 11.8 |
| 25 | 7.33 | 7.72 |
| 50 | 4.58 | 5.17 |
| 75 | 2.38 | 2.92 |

Example 3

Selective Stress Relief of Tetrathiol/Divinyl Ether/MDTO Materials

Stress gradients through specimens were introduced by irradiating rectangular, optically thick specimens on one side only that were under tension. These specimens were almost equivalent to those used in the stress relaxation experiments; however, they contained 0.1 wt % Irgacure 784 and 2.5 wt % Irgacure 819 before polymerization to yield a significant optical gradient through the specimen thickness. They were irradiated at 365 nm, 20 mW·cm$^{-2}$ for 15 seconds while under a strain of 0.0375.

Figure 3:
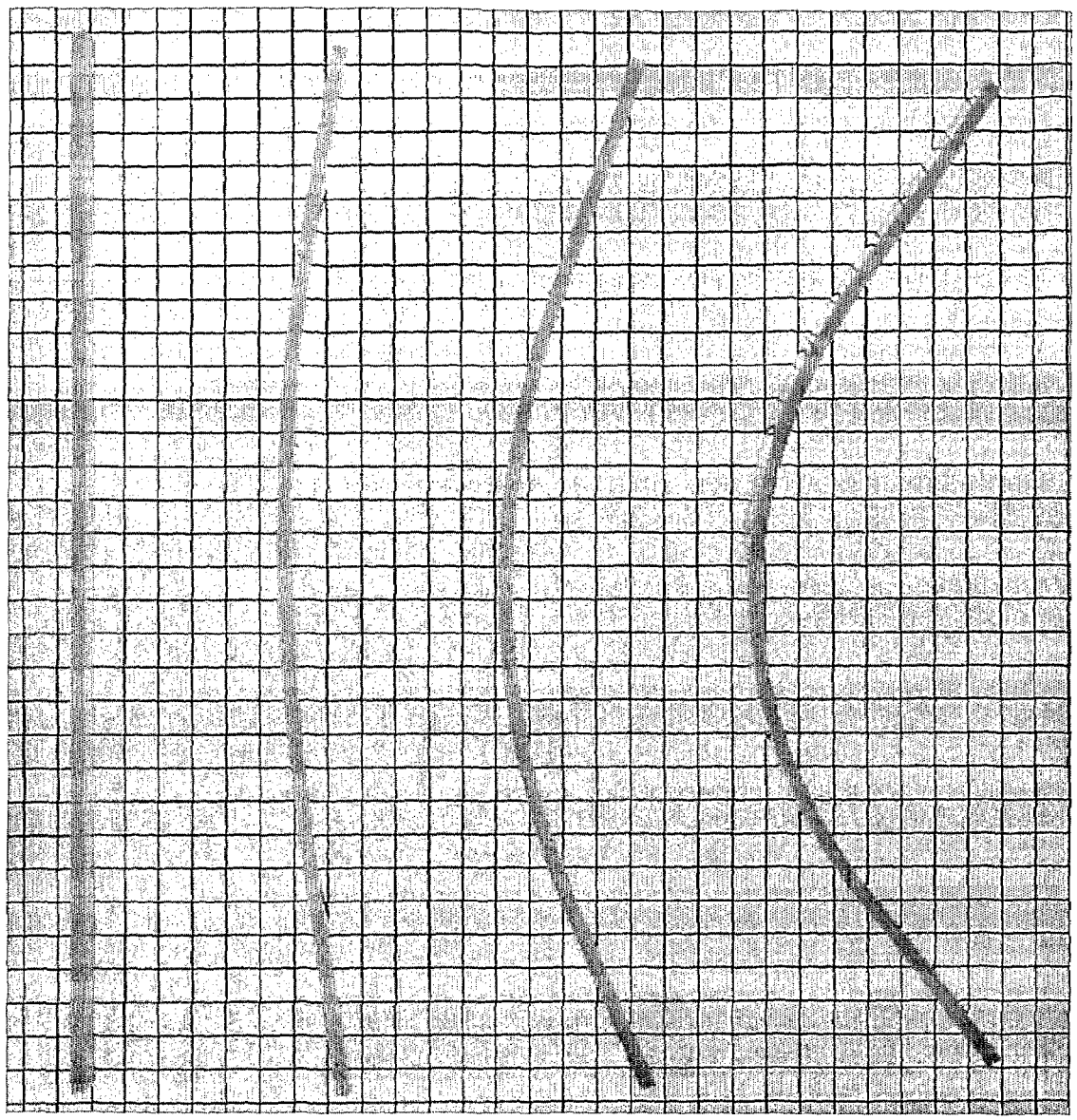
FIG. 3: Tetrathiol/divinyl ether/MDTO specimens with stress gradients through their thickness on a 2 mm×2 mm grid. Specimens from left to right 0, 25, 50, and 75 wt % MDTO. The direction of irradiation (365 nm, 20 mW/cm² for 15 seconds) used for the creation of the stress gradient was from left to right.

FIG. 3 shows specimens with stress gradients through their thickness on a 2 mm×2 mm grid. Specimens from left to right: 0, 25, 50 and 75 wt % MDTO. The direction of irradiation (365 nm, 20 mW·cm$^{-2}$ for 15 seconds) used for the creation of the stress gradient for each specimen was from left to right.

Example 4

Figure 4:
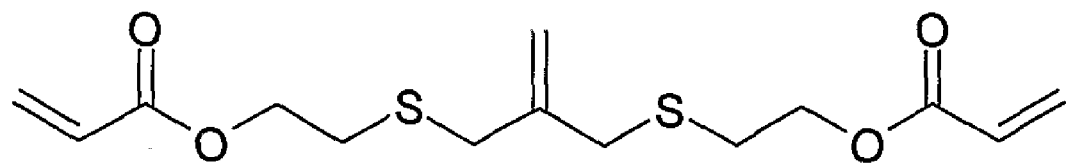
FIG. 4: Three linear monomers containing addition-fragmentation chain transfer functionalities in their backbone.
Figure 4:
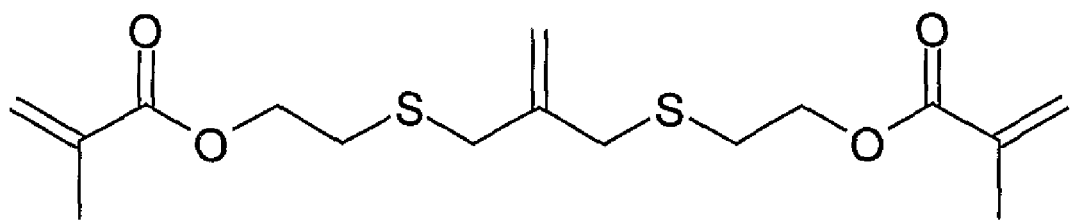
Figure 4:
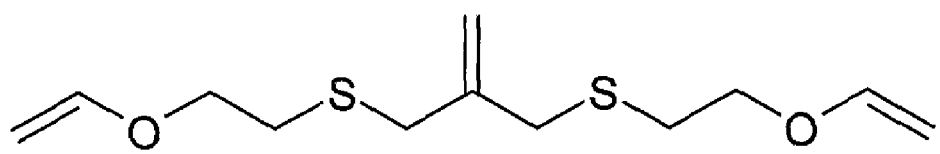

Linear Difunctional Monomers Containing Addition-Fragmentation Chain Transfer Functionalities in their Backbone FIG. 4 illustrates three linear monomers containing addition-fragmentation chain transfer functionalities in their backbone, these monomers include difunctional acrylate and methacrylate monomers, as well as a linear divinyl ether monomer. Synthesis methods for the monomers shown in FIG. 4 are given below.

Synthesis of a Dimethacrylate Containing an Addition-Fragmentation Functionality (2-methylene-propane-1,3-di(thioethyl methacrylate) (MDTMA))

Synthesis of 2-[2-(2-hydroxy-ethylsulfanylmethyl)-allylsulfanyl]-ethanol: 3-Mercapto-2-(mercaptomethyl)-1-propene was synthesized according to the literature method (Evans, R. A. and Rizzardo, E. 2000, Macromolecules, 33(18), 6722-6731. Sodium (8.05 g, 0.35 mol) was dissolved in dry methanol under nitrogen and refluxed. Solutions of 3-mercapto-2-(mercaptomethyl)-1-propene (18.35 g, 0.15 mol) in 30 ml methanol and 2-chloroethanol (27.20 g, 0.34 mol) in 30 ml methanol were added simultaneously to the methanolic sodium solution and allowed to reflux for three hours. The methanol was then evaporated off, water was added and the solution was extracted with ethyl acteate. The ethyl acetate extract was washed with water, dried over calcium chloride, filtered and evaporated to yield 26.21 g (66% yield).

Under nitrogen, 2-[2-(2-hydroxy-ethylsulfanylmethyl)-allylsulfanyl]-ethanol (12.98 g, mol) and triethylamine (16.38 g, mol) were dissolved in dichloromethane in an ice bath and methacryloyl chloride (16.94 g, mol) was added dropwise. The solution was allowed to stir overnight while the bath warmed to room temperature.

Synthesis of an Acrylate Containing an Addition-Fragmentation Functionality (2-methylene-propane-1,3-di(thioethyl acrylate) (MDTA))

Under nitrogen, 2-[2-(2-hydroxy-ethylsulfanylmethyl)-allylsulfanyl]-ethanol (12.60 g, mol) and triethylamine (15.92 g, mol) were dissolved in dichloromethane in an ice bath and acryloyl chloride (14.24 g, mol) was added dropwise. The solution was allowed to stir overnight while the bath warmed to room temperature.

Synthesis of 2-methylene-propane-1,3-di(thioethyl vinyl ether) (MDTVE)

2-Methylene-propane-1,3-di(thioethylvinylether) (MDTVE) was synthesized from 3-mercapto-2-(mercaptomethyl)-1-propene and 2-chloroethyl vinyl ether in a manner analogous to that described in the literature Evans, R. A. and Rizzardo, E. 2001, J. Polym. Sci A, Polym. Chem., 39(1), 202-215). The crude oil was purified by bulb-to-bulb distillation.

Polymerizations involving divinyl ether monomers containing the addition-fragmentation functionality can be partially decoupled from stress relaxation by cationically photopolymerizing the divinyl ether containing the addition-fragmentation functionality while varying either the concentration of a radical photoinitiator or using a radical photoinitiator absorbing at a different wavelength.

Conversion versus time was measured for a dimethacrylate containing an addition-fragmentation chain transfer functionality (MDTMA) formulated with 0.25 wt % Irgacure 819 and irradiated at 400-500 nm, 5 mW·cm$^{-2}$ at room temperature was found to be approximately 70% at 16 minutes. The corresponding conversion for tetraethylene glycol dimethacrylate (TETGDMA) was approximately 80% at 16 minutes. The irradiation was started at t=1 minute.

Example 5

Formulation of Tetrathiol/Divinyl Ether/MDTO Materials

The polymer studied was formed from 75 wt % of a stoichiometric mixture of pentaerythritol tetra(3-mercaptopropionate) (PETMP) and 2-methylene-propane-1,3-di(thioethyl vinyl ether) (MDTVE) and 25 wt % of 2-methyl-7-methylene-1,5-dithiacyclooctane (MDTO) which produces a rubbery crosslinked network with a $T_g$ of $-22°$ C. and a tensile modulus at room temperature of 9.5 MPa. The monomers used to produce the Tetrathiol/Divinyl Ether/MDTO materials are shown in Scheme 2. Monomers used were ((A) PETMP; (B) MDTVE; (C) MDTO) and (D) addition-fragmentation mechanism through the polymer backbone of the resultant polymer.

Resins were formulated with two photoinitiators, Irgacure 819 (a phenylphosphine oxide derivative active in the blue and near ultraviolet from Ciba Specialty Chemicals) at 1.0 wt % and Irgacure 651 (a dialkoxy acetophenone derivative active in the near ultraviolet from Ciba) at 2.0 wt %. The specimens were fully cured under irradiation for ten minutes at 400-500 nm at room temperature. The visible photoinitiator photolyses rapidly and photobleaches significantly during the curing stage, thus the ultraviolet photoinitiator was included in the formulation to ensure residual photoinitiator capable of introducing radicals in each specimen upon irradiation.

A light intensity gradient through the sample was produced by formulating the resin with an ultraviolet absorber (0.5 wt % Tinuvin 328 a hydroxyphenylbenzotriazole derivative ultraviolet absorber from Ciba). A control network not containing the ultraviolet absorber was also produced. Addition of a strongly UV absorbing compound to the standard formulation enabled the transmittance through the 0.15 mm thick fully cured samples to be readily decreased (from 57% transmittance at 365 nm for a sample without Tinuvin 328 to 0.038% transmittance at 365 nm for a sample with 0.5 wt % Tinuvin 328) without changing other material properties.

The rate of stress relaxation due to chain transfer through the allyl sulfide functionalities increases at elevated functional group concentrations (Scott, T. et al., 2005, Science 308, 1615). A network produced from a stoichiometric PETMP/MDTVE mixture possesses one allyl sulfide group per crosslink. The addition of 25 wt % MDTO to the PETMP/MDTVE mixture produces a network with approximately two allyl sulfide groups per crosslink. Although an elastomer produced only from a stoichiometric mixture of PETMP and MDTVE is able to produce the desired stress relaxation, the addition of MDTO greatly enhanced the rate and extent of stress relaxation to emphasize the observed phenomenon.

Scheme 2.

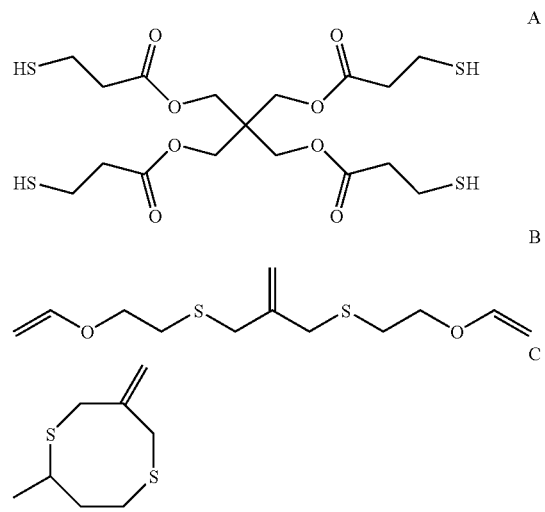

-continued

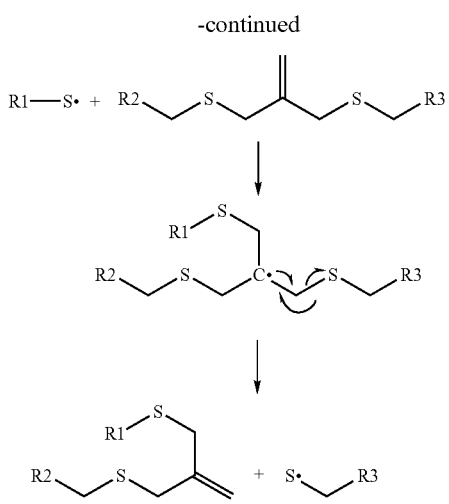

Example 6

Photoinduced Stress Relaxation in Tetrathiol/Divinyl Ether/MDTO Materials

Figure 5:
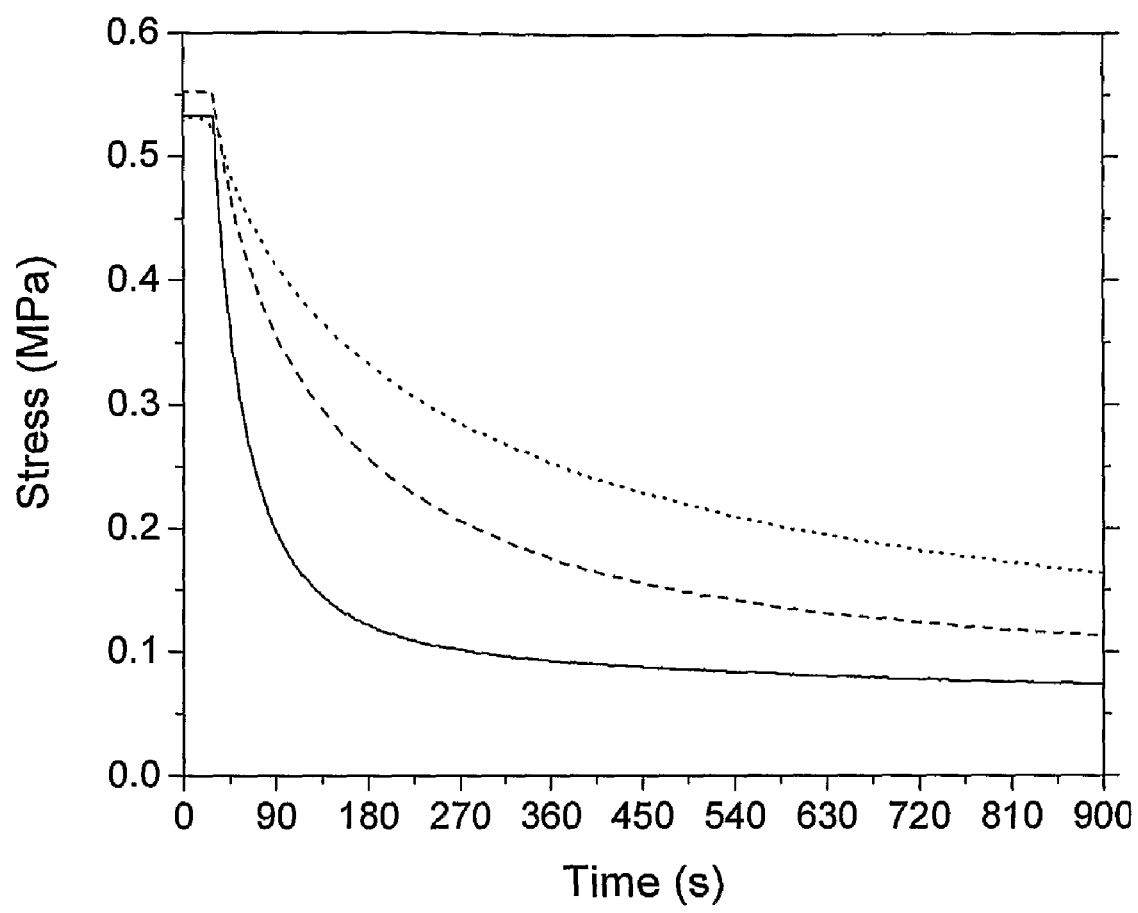
FIG. 5: Dependence of the rate of photoinduced stress relaxation for cured 75 wt % PETMP-MDTVE/25 wt % MDTO on the incident light intensity. A tensile strain of 0.060 was applied to these samples, followed by irradiation at 365 nm at various intensities (solid line, 40 mW·cm$^{-2}$; dashed line, 10 mW·cm$^{-2}$; dotted line, 4 mW·cm$^{-2}$) beginning at t=0.5 minutes.

The tetrathiol/divinyl ether/MDTO materials used were those described in Example 5. FIG. 5 shows the dependence of the rate of photoinduced stress relaxation for cured 75 wt % PETMP-MDTVE/25 wt % MDTO on the incident light intensity. In FIG. 5, the solid line denotes an intensity of 40 mW/cm2, the dashed line 10 mW/cm$^2$ and the dotted line 4 mW/cm$^2$. In FIG. 5, a tensile strain of 0.060 was applied to these samples, followed by irradiation at 365 nm beginning at t=5 minutes.

The decrease in the overall stress relaxation rate in the sample containing 0.5 wt % Tinuvin 328 resulted from a reduction in the average light intensity. Though the average stress relaxation rate is lower, the relaxation rate at the incident side remains just as rapid. Uniquely, because the rate of stress relaxation is directly proportional to the light intensity, the stress relaxation rate at the unirradiated side is reduced by 1500 times for a sample containing 0.5 wt % Tinuvin 328 when compared with a sample without any UV absorber.

During the irradiation of the previously unirradiated side, the stress release results in the polymer bending away from the light and decreasing the angle of curvature (θ in FIG. 1a), as shown in FIG. 1b. It is also possible to irradiate such a sample on the already-irradiated side to increase the angle of curvature; however, extended exposure on a single side depletes the initiator that is required to generate the radicals. Here, even at long exposure times, the sample never returned to its original flat shape. The reasons for this are two-fold. Firstly, while stress is relieved preferentially on the irradiated side, this preference is not perfect. As shown in FIG. 5, despite the high attenuation of light through the sample, more than half the initial stress was relieved over the course of the irradiation time. This means that stress was being relieved in more than just the exposed half of the sample. Thus, when the sample is irradiated on the previously unexposed side and stress is relieved predominantly on that side, stress is also relieved on the other side. Clearly, an optimal exposure time exists for inducing the maximum initial deformation and subsequent recovery where the stress has been largely relieved on the incident side while largely remaining on the opposite side. Finally, there is a limit on the stress that may be relieved as a small amount of residual stress remains, even in transparent samples, following exposure. While the residual stress is slightly reduced in samples whose initial stress is lower, a small amount of residual stress remains in each sample, likely due to the complete decomposition of the photoinitiator before the stress was fully relieved.

We claim:

1. A method for inducing reversible chain cleavage of polymer chains in a crosslinked polymeric material, the method comprising the steps of
    a) providing a polymeric material comprising a crosslinked network of polymer chains and a source of free radicals or cations, wherein a plurality of the polymer chains incorporate a reversible chain cleavage group;
    b) activating the source of free radicals or cations in the polymeric material of step a) to produce free radicals or cations;
    c) activating a plurality of reversible chain cleavage groups by reacting the reversible chain cleavage groups in the polymeric material of step a) with the free radicals or cations of step b) to produce reversible chain cleavage of a plurality of the polymer chains incorporating a reversible chain cleavage group;
    d) recombining cleaved polymer chains from step c).

2. The method of claim 1, wherein the reversible chain cleavage group is an addition-fragmentation-type reversible chain transfer group.

3. The method of claim 2, wherein the source of free radicals or cations is a photoinitiator.

4. The method of claim 3, wherein the source of free radicals or cations comprises two photoinitiators which are activated by different wavelengths of light.

5. The method of claim 2 wherein the reversible chain cleavage group is a reversible addition fragmentation transfer (RAFT) agent.

6. The method of claim 2, wherein the reversible chain cleavage group comprises an allyl sulfide functionality.

7. A method of making a polymeric material, the method comprising the steps of:
    forming a mixture comprising a source of free radicals or cations and one or more monomers, wherein at least one monomer is characterized by $R_1$—Z—$R_2$ and subjecting the mixture to polymerization conditions wherein $R_1$ and $R_2$ independently comprise a polymerizable group and Z is a reversible chain cleavage group which is an addition-fragmentation-type reversible chain transfer group.

8. The method of claim 7 wherein Z comprises an allyl sulfide group.

9. The method of claim 7 wherein the polymerizable group of $R_1$ and the polymerizable group of $R_2$ are each independently selected from the group consisting of acrylates, methacrylates, vinyl ethers and allyl ethers.

10. The method of claim 7, wherein the mixture comprises a source of free radicals.

11. A polymeric material made by the method of claim 7, wherein the polymeric material comprises a crosslinked network of polymer chains and a plurality of the polymer chains incorporate the reversible chain cleavage group which is an addition-fragmentation-type reversible chain transfer group.

12. A polymeric material comprising:
    a crosslinked network of polymer chains, wherein a plurality of the polymer chains incorporate a reversible chain cleavage group which is an addition-fragmentation-type reversible chain transfer group; and a source of free radicals or cations present in an amount effective to produce greater than 10% stress relief in at least a portion of the material.

13. The material of claim 12, wherein the source of free radicals or cations is a photoinitiator.

14. The material of claim 12 wherein the reversible chain cleavage group is a reversible addition fragmentation transfer (RAFT) agent.

15. The material of claim 12, wherein the reversible chain cleavage group comprises an allyl sulfide functionality.

16. A monomer having the structure

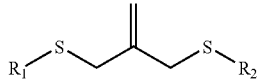

where $R_1$ and $R_2$ independently comprise a polymerizable group.

17. The monomer of claim 16, wherein the polymerizable group of $R_1$ and the polymerizable group of $R_2$ are each independently selected from the group consisting of acrylates, methacrylates, vinyl ethers and allyl ethers.

18. The material of claim 11, wherein a plurality of the polymer chains incorporate at least one reversible chain cleavage group in the polymer backbone.

19. The material of claim 12, wherein a plurality of the polymer chains incorporate at least one reversible chain cleavage group in the polymer backbone.

20. The method of claim 2, wherein an iniferter provides the source of free radicals.

21. The method of claim 20, wherein the iniferter is a dithiocarbamate or a thiuram difsulfide.

* * * * *